United States Patent [19]

Braun et al.

[11] 3,931,426

[45] Jan. 6, 1976

[54] MARKING TAPE ASSEMBLY

[75] Inventors: Philip N. Braun; Robert J. Filsinger, both of Syracuse, N.Y.

[73] Assignee: Philip N. Braun, Syracuse, N.Y.

[22] Filed: July 11, 1974

[21] Appl. No.: 487,544

Related U.S. Application Data

[63] Continuation-in-part of Ser. No. 301,658, Oct. 27, 1972, abandoned, and a continuation-in-part of Ser. No. 170,169, Aug. 9, 1971, abandoned.

[52] U.S. Cl..................... 428/40; 40/2 R; 282/19 B; 427/153; 428/77; 428/121; 428/343; 428/354

[51] Int. Cl.$^2$.......................................... B32B 3/04

[58] Field of Search............... 40/2 R; 156/234, 240; 282/8 B, 19 B, 22 A, 23 A, 24 B; 283/18, 21; 427/146, 153; 428/40, 77, 121, 343, 354, 388

[56] References Cited

UNITED STATES PATENTS

| | | | |
|---|---|---|---|
| 674,058 | 5/1901 | Felch | 282/27 A |
| 972,550 | 10/1910 | Lewis | 282/22 A |
| 1,393,213 | 10/1921 | Gilbert | 282/27 A |
| 2,035,768 | 3/1936 | Sherman et al. | 427/152 |
| 2,096,559 | 10/1937 | Riley | 428/121 X |
| 2,282,610 | 5/1942 | Rotherick | 282/26 |
| 2,648,924 | 8/1953 | Brewster | 40/2 |
| 2,670,971 | 3/1954 | Johnson | 282/19 |
| 2,800,214 | 7/1957 | Symonds | 197/136 |
| 2,976,062 | 3/1961 | Brechner | 282/29 |
| 3,135,533 | 6/1964 | Short | 40/2 R X |
| 3,153,868 | 10/1964 | Jones | 40/2 |
| 3,691,005 | 9/1972 | Butler | 428/81 |

*Primary Examiner*—George F. Lesmes
*Assistant Examiner*—Henry F. Epstein
*Attorney, Agent, or Firm*—Charles S. McGuire

[57] ABSTRACT

An assembly for imprinting indicia upon a tape in the form of a small strip of cloth, plastic, etc., to be applied by heat sensitive adhesive to an item to be identified by the indicia on the label. The assembly includes a sheet of carbon paper, or the like, for transfer of the marking material to the label by localized pressure, and a sheet of material having a pressure sensitive adhesive on one side. The assembly is so constructed that the tape is in facing engagement with the transfer layer of the carbon paper and the pressure sensitive adhesive is disposed for engagement with an underlying support surface to hold the assembly firmly in position while the markings are being applied.

10 Claims, 12 Drawing Figures

MARKING TAPE ASSEMBLY

REFERENCE TO RELATED APPLICATION

This is a continuation-in-part of copending application Ser. No. 301,658, filed Oct. 27, 1972 and application Ser. No. 170,169, filed Aug. 9, 1971, both of which prior applications are now abandoned.

BACKGROUND OF THE INVENTION

It is often desirable to affix an indicia bearing label to items such as garments, bed linens, etc., for identification purposes. Commonly, some form of adhesive label is used for this purpose, e.g., tapes having a heat sensitive coating on one side to allow application of the label to the identified item in a substantially permanent manner by application of heat and pressure from an iron. The identifying marks are placed on the surface of the tape opposite the heat-sensitive coating with a suitable permanent marking material.

For convenience, marking tape assemblies have been provided wherein the tape is initially positioned beneath a sheet having the marking material incorporated therein and transferable to the type by pressure. A sheet of carbon paper, for example, may be superposed with the tape strip and suitable means provided for temporarily retaining the two in superposed relation. After the desired markings are made on the tape surface by applying localized pressure to the carbon paper, the tape is applied to the item to be identified and the remainder of the assembly discarded.

One of the difficulties encountered in the use of such assemblies is that, due to the small size thereof, it is often inconvenient to hold the assembly while applying the markings. The present invention is particularly directed to the provision of a marking tape assembly which is easily and firmly held in position while markings are being applied thereto by handwriting, typewriting, etc.

SUMMARY OF THE INVENTION

The item of end use, i.e., a strip of labeling tape of cloth, plastic, or the like, is initially incorporated in an assemblage including a layer of carbon paper having its coated surface in contact with at least one side of the tape. A sheet having a pressure sensitive adhesive on one surface is also provided in the assemblage, preferably with a removable, protective sheet covering a portion of the adhesive. Upon removal of the latter-mentioned sheet, in embodiments where it is used, the adhesive layer may be pressed against a support surface, thereby securing the assemblage thereto with the marking area in position to receive marking imprints. That is, when the assemblage is temporarily secured to a surface suitable to act as a firm support for marking purposes, the portion of the assemblage to which the marking impressions are to be applied is uppermost. After such marking, the tape is removed from the assemblage and applied by a hot iron, or the like, to wearing apparel, bed linen, or other items which require labeling.

The marking tape is preferably retained in the assembly, prior to and during the application of the marking impressions, by being placed between two layers of other portions of the assembly without being attached thereto. In one embodiment, the carbon paper is folded to provide a two-layer wrapper for the tape with the transfer surface of the carbon paper contacting both sides of the tape.

In another embodiment, a separate sheet is provided to form the wrapper for the tape with the carbon paper also positioned between the folds of the wrapper sheet. In this embodiment, edge portions of both the carbon paper and the wrapper sheet are attached to the pressure sensitive adhesive sheet and the wrapper sheet, being approximately twice as long as the carbon paper, is folded back over the marking surface thereof. This allows insertion of the marking tape between the carbon paper and folded portion of the wrapper sheet with only the print-receiving side of the tape contacting the marking or transfer surface of the carbon paper. Although requiring an extra sheet, this embodiment is less expensive to produce than that using an elongated carbon paper sheet as the wrapper since the ordinary paper used for the wrapper sheet is much less expensive than the carbon paper. Also, there is less tendency for smudging to occur from unintentional rub-off from the transfer surface since there is less carbon paper in the assembly, and since only one side of the tape is contacted by a transfer surface. It is also contemplated that the individual strips of marking tape may be packaged separately from the remainder of the assembly and placed within the wrapper when the markings are to be applied.

DETAILED DESCRIPTION

Figure 9:
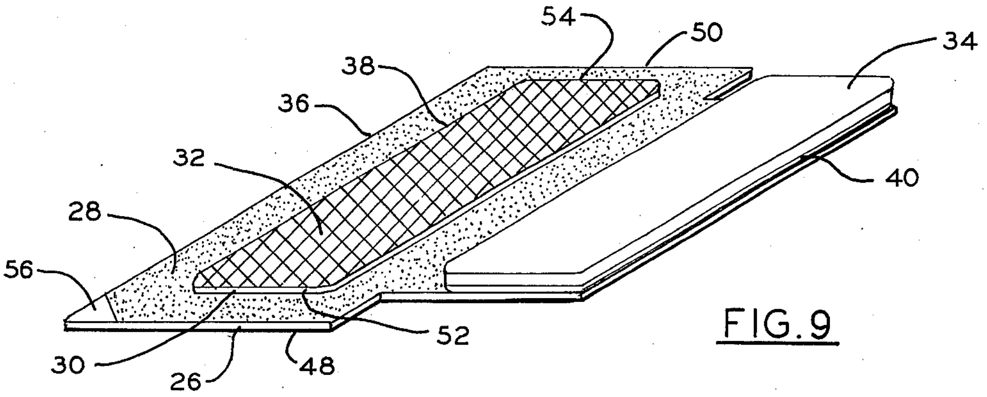
FIG. 9 is a perspective view of a modified form of the assembly of the FIGS. 4–6 embodiment.

Referring now to the drawings, the marking tape assembly of the invention is shown in all Figures with the thickness of the various layers greatly exaggerated for greater clarity. The embodiment shown in FIGS. 1–3 includes a strip of material 10, preferably a flexible material such as paper, with a conventional pressure sensitive adhesive 12 on one surface thereof. Secured to the adhesive surface of strip 10, along mutually overlapping edges, is sheet 14 comprising a flexible carrier layer with a transferable permanent marking material coated on surface 16 (FIG. 3). Sheet 14 may conveniently comprise a suitably sized portion of ordinary carbon paper, surface 16 being cross hatched to indicate the transfer material.

Figure 1:
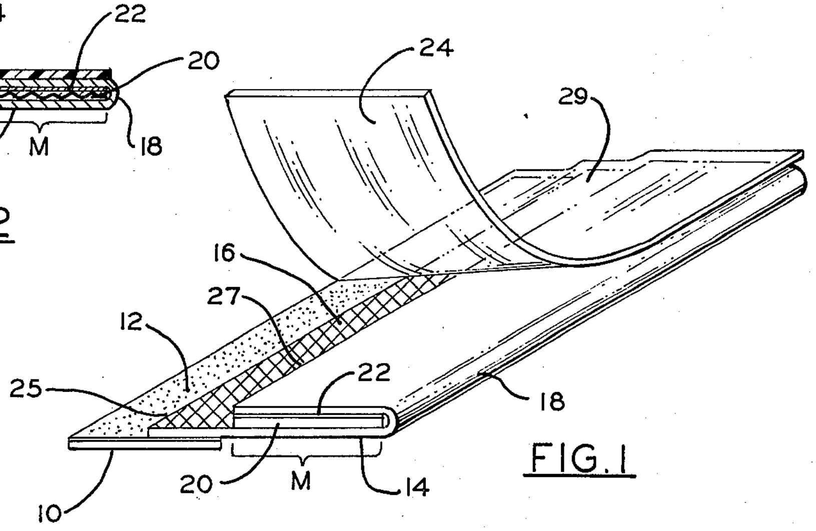
FIG. 1 is a perspective view of a first embodiment of the marking tape assembly.

In the form in which the assembly is initially provided, sheet 14 is folded, as shown in FIG. 1, along a line 18 parallel to the edge secured to strip 10. Between the two layers formed by the folding of sheet 14 is marking tape 20 having one surface coated with a layer of heat sensitive material 22 such as any suitable thermoplastic or thermosetting plastic. Tape 20 is preferably a flexible tape of cloth, plastic, or the like, suitable for receiving a permanent marking material such as may be transferred from surface 16.

Protective sheet 24 is initially arranged in overlying relation to that portion of the adhesive surface of strip 10 which is not covered by sheet 14. An edge of sheet 24 is secured to and covers substantially entire portion of surface 12 not covered by the overlapping edge of sheet 14, and sheet 24 extends from its attachment with surface 12 in covering relation to folded sheet 14. The principal function of sheet 24 is to protect adhesive surface 12 and to help maintain sheet 14 in the folded condition. Sheet 24 may be formed of any thin, flexible material, such as a polyethylene film or release paper. Prior to use of the assembly, sheet 24 prevents adherence of surface 12 to other objects or materials.

It will be noted that the layer of sheet 14 which is attached to sheet 10, i.e., that portion between edge 25 and fold line 18, is somewhat longer than the other layer, i.e., the portion between edge 27 and fold line 18. The latter portion is preferably of a width substantially equal to that of tape 20. In this way tape 20 remains spaced an appreciable distance from surface 12 and there is no substantial liklihood of undesirable adherence between tape 20 and surface 12. Furthermore, since tape 20 is not secured to sheet 14, but merely retained between the folded layers thereof, the provision of a covering layer of the same width as the tape will readily reveal any shifting of tape 20 away from the position it should occupy when the markings are applied. This is particularly easily evident when sheet 24 is formed of a transparent material, such as clear polyethylene, which in effect forms a window in the area generally indicated by reference numeral 29, between edges 25 and 27. That is, if an edge of tape 20 is observed in area 29 it should be moved back fully between the two layers of sheet 14 before the markings are applied.

When the assembly is to be used for applying markings to tape 20, sheet 24 is peeled away to expose surface 12. The assembly is then secured to a supporting surface by pressing the exposed portion of surface 12 into engagement therewith. The desired indicia may be placed on tape 20 by pressing on the outer surface of sheet 14, in the area indicated in FIGS. 1 and 2 with the letter M, with a pencil, ballpoint pen, typewriter, stylus, etc. Actually, since transfer surface 16 contacts both sides of tape 20 the markings could be applied from either side, assuming tape 20 is arranged with material 22 on the side opposite that on which the markings are applied. It is normally more convenient to apply surface 12 facing downward, however, as on a desk top, or the like. Thus, marking area M is indicated to be on the side of sheet 14 opposite surface 12 of strip 10.

It should be noted that with surface 16 opposing both sides of tape 20, marking material will be transferred to both sides, as indicated in FIG. 3. Thus, it is preferred that material 22 be of a type not only suited as a heat sensitive adhesive, but also as receptive to the marking material. With the marking material being transferred to both sides of the tape, it has the tendency to penetrate all the way through and be more permanent than if applied from one side only.

Figure 6:
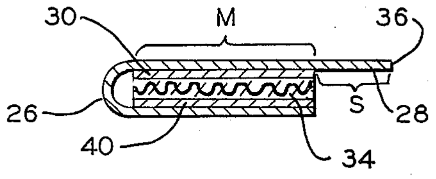
Figure 4:
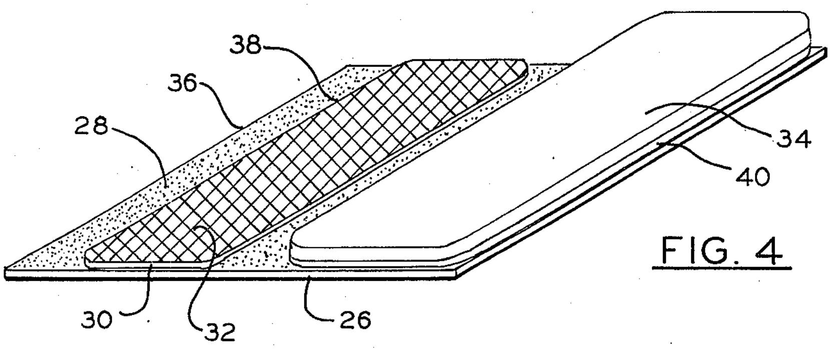
FIG. 4 is a perspective view of a second embodiment.

Turning now to FIG. 4, there is shown another embodiment wherein the adhesive sheet carries both the carbon paper and the tape. Sheet 26 has pressure sensitive adhesive 28 over substantially all of surface thereof. Secured to the adhesive surface are sheet 30, having transfer 32, and tape 34. Edge 36 of sheet 26 is parallel to but spaced from edge 38 of sheet 30, thereby providing an area of adhesive surface 28 not covered by either sheet 30 or tape 34. When sheet 26 is folded over, as shown in FIG. 6, to bring sheet 30 and tape 34 into juxtaposition, edge 36 extends outwardly from the remainder of the assembly, thereby leaving area "S" of surface 28 exposed for the purpose of securing the assembly to a supporting surface as markings are applied in area "M". The coating of heat-sensitive adhesive material 40 on tape 34 is applied directly to the pressure sensitive adhesive of surface 28.

Figure 7:
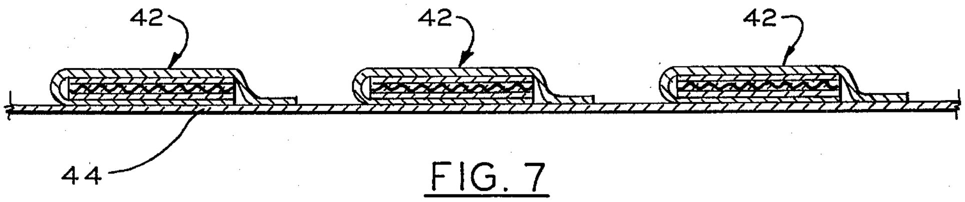
FIG. 7 is a side sectional view of a plurality of assemblies such as that of FIGS. 4–6 releasably secured to a carrier sheet.
Figure 8:
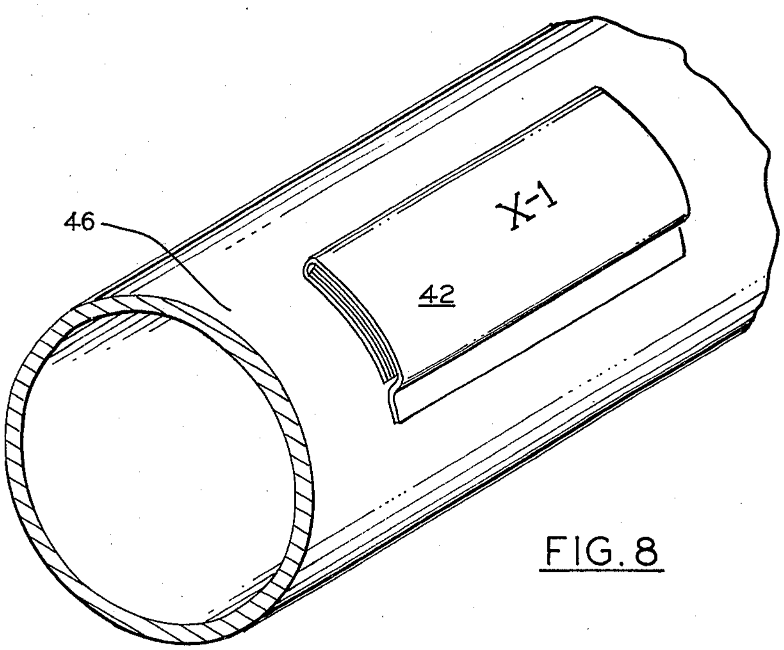
FIG. 8 is a perspective view of a tape assembly secured to a typewriter roll.

In FIG. 7 a plurality of the marking tape assemblies of the invention, each indicated generally by the reference numeral 42, are shown secured to carrier sheet 44. The assemblies may conveniently be packaged or stored in this manner, or may be so mounted for applications wherein markings are applied to several assemblies in succession, the large sheet 44 being easy to hold whereas the individual small assemblies would be difficult if not secured to a support. Carrier sheet 44 may also be inserted in a typewriter for typing of the markings on the individual assemblies in succession without removing and replacing each of the assemblies in the typewriter. FIG. 8 illustrates how an individual assembly 42 may be secured to typewriter roll 46 so that typed markings may be imprinted upon the tape without the inconvenience of trying to hold the small assembly steady in position to be typed upon.

Figure 5:
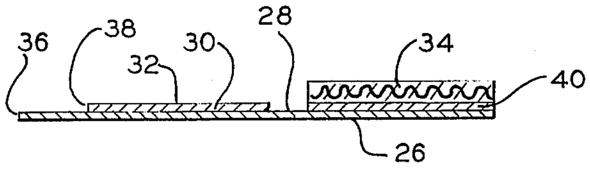
FIGS. 5 and 6 are side sectional views of the assembly of FIG. 4 in unfolded and folded condition, respectively.

The form of the invention shown in FIG. 9 is a modification of the embodiment shown in FIGS. 4–6. Reference numerals, therefore, are the same as in the previously described embodiment, the assembly including sheet 26 having pressure sensitive adhesive surface 28, sheet 30 with transfer surface 32, and tape 34 with heat sensitive adhesive material 40. In this form, edges 48 and 50 as well as edge 36 of sheet 30 are spaced outwardly from corresponding parallel edges 52, 54 and 38 of sheet 30. Thus, when the assembly is folded to juxtapose sheet 30 and tape 34, the side edges as well as the longitudinal edge will adhere to the support surface and provide a non-hinging attachment, where desired. Corner 56 may be left without adhesive to facilitate removal of the assembly from the support.

Figure 2:
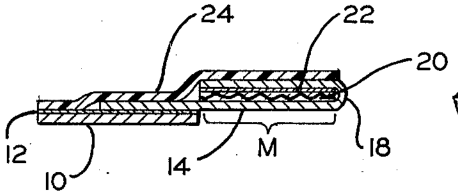
FIG. 2 is a side sectional view of the assembly of FIG. 1.
Figure 3:
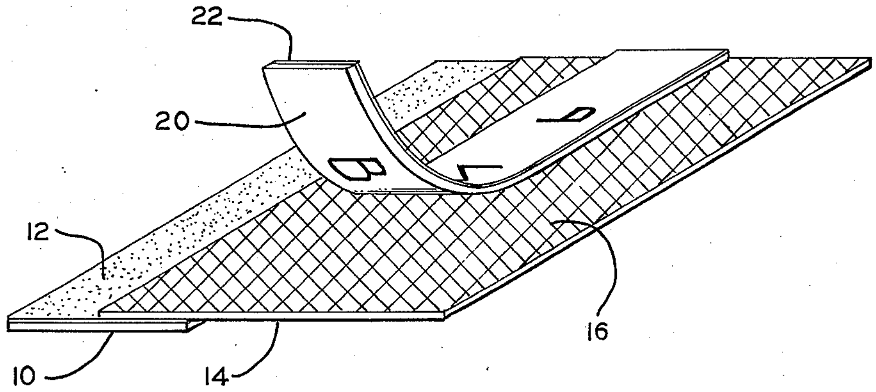
FIG. 3 is another perspective view of the assembly of FIGS. 1 and 2, showing the tape from the adhesive side after marking with the assembly unfolded.
Figure 10:
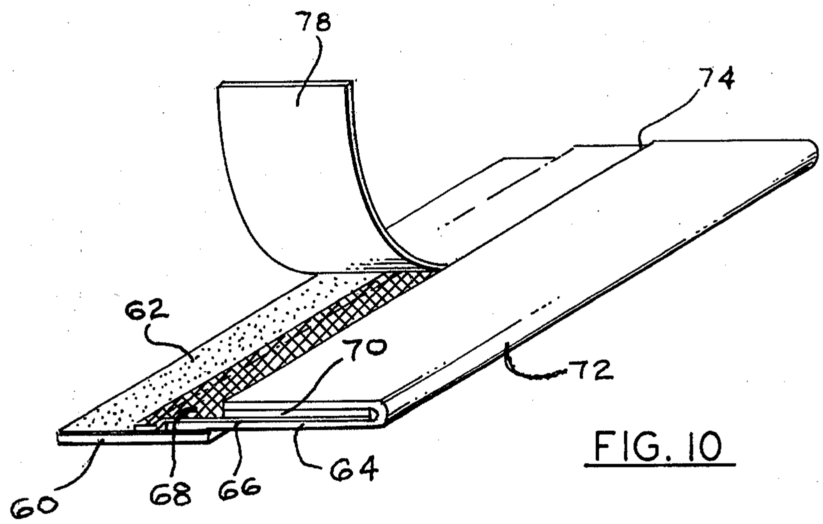
FIG. 10 is a perspective view of another embodiment of the marking tape assembly.
Figure 11:
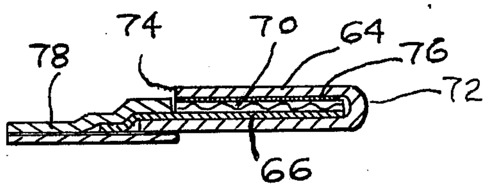
FIG. 11 is a side sectional view of the assembly of FIG. 10.
Figure 12:
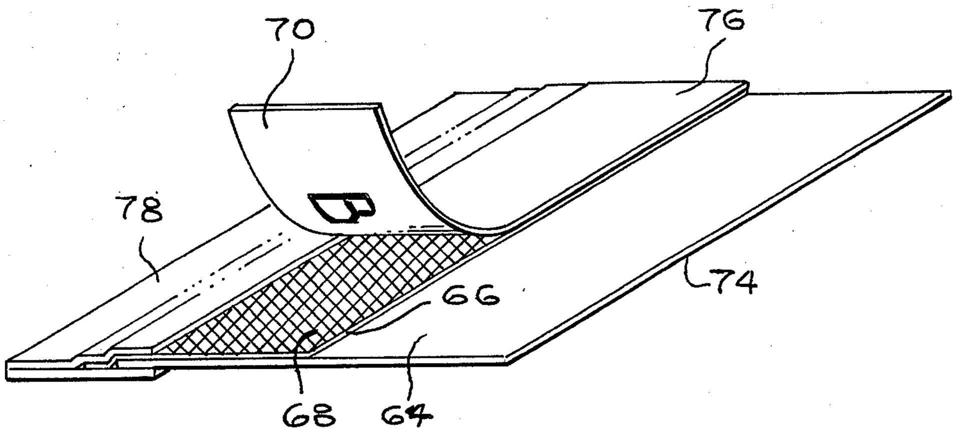
FIG. 12 is another perspective view of the assembly of FIGS. 10 and 11, shown after application of the markings to the tape.

In FIGS. 10–12, another embodiment is shown, similar to that of FIGS. 1–3, but using an additional sheet to provide the wrapper for the marking tape. In this embodiment, reference numeral 60 denotes the strip having pressure sensitive adhesive on surface 62 thereof. A marginal edge portion of wrapper sheet 64 is secured to surface 62 along one edge of strip 60. Sheet 66, having pressure transferable marking material on surface 68, is attached along a marginal edge to surface 62 adjacent the attached edge of wrapper sheet 64. The latter is folded as shown in FIGS. 10 and 11, to extend in covering relation to a major portion of surface 68 of sheet 66. The label sheet or tape 70 is placed between sheet 66 and the overlying portion of sheet 64, the dimension between fold line 72 and free edge 74 of sheet 64 preferably being substantially equal to the width of tape 70. The print-receiving side of tape 70 is, of course, placed in facing relation to transfer surface 68 of sheet 66, the opposite surface of tape 70 being provided with heat-sensitive coating 76, as in previously described embodiments.

Protective sheet 78 initially covers the portion of adhesive surface 62 of strip 60 not covered by the attached edges of sheets 64 and 66. When the assembly is ready for use, sheet 78 is peeled away to expose the pressure sensitive surface and allow attachment thereof to an underlying support. When the assembly is so arranged, the print receiving surface of tape 70 is facing upwardly to receive markings transferred from downwardly facing transfer surface 68 of sheet 66. After the desired markings have been applied, tape 70 is removed for attachment to the article to be marked, and the remainder of the assembly is discarded.

It is preferred that the label tape which receives the marking impressions be unattached, as by pressure sensitive adhesive, or the like, to the remainder of the assembly, as in the embodiments of FIGS. 1–3 and FIGS. 10–12. In each of these embodiments a "sling" is formed by a folded sheet of the assembly to provide two layers between which the tape may be retained while the markings are applied. In each embodiment the assembly is firmly held in position on the underlying support surface by attachment thereto of a portion of the pressure sensitive surface of the adhesive strip.

Other modifications in the size and arrangement of parts will be apparent to those skilled in the art. For example, the assemblies may be provided in continuous lengths and cut off individually as desired. Also, with specific reference to the embodiment of FIGS. 10–12, the dimension from fold line 72 to free edge 74 may be slightly longer than the width of tape 70 and the free edge of the wrapper sheet folded around the edge of the tape to prevent the tape from being inadvertently displaced prior to application of the markings thereto.

What is claimed is:

1. A marking tape assembly for applying permanent marking indicia to an identifying label, said assembly comprising in combination:

a. a first sheet having a pressure sensitive adhesive on one surface thereof;
b. a second sheet having a pressure transferable permanent marking material on one surface thereof;
c. a tape element having a heat sensitive adhesive on one surface thereof and adapted to receive on the other surface markings transferred from said one surface of said second sheet;
d. said first and second sheets being secured together by said pressure sensitive adhesive, a first portion of said one surface of said first sheet being covered by said second sheet, and a second portion adapted to be exposed for adherence to a support surface;
e. said second sheet and said tape being so constructed and arranged that said one surface of said second sheet is in facing engagement with said other surface of said tape, and the latter is disposed to receive markings transferred from said second sheet when said second portion of said one surface of said first sheet is secured to a support surface; and
f. a protective sheet releasably secured to said first sheet in covering relation to said second portion of said one surface.

2. The invention according to claim 1 wherein said second sheet comprises a sheet of carbon paper.

3. The invention according to claim 1 wherein a first longitudinal edge portion only of said second sheet is attached to said first sheet, leaving the major portion unattached, and the unattached portion of said second sheet is folded along a line parallel to said first longitudinal edge with said one surface innermost to provide two layers with said tape disposed between said layers and in contact with said one surface of said second sheet.

4. The invention according to claim 1 wherein said protective sheet extends from covering relation with said first sheet to lie in unengaged, covering relation to at least a portion of said other surface of said second sheet.

5. The invention according to claim 4 wherein said protective sheet is transparent.

6. The invention according to claim 1 wherein both said second sheet and said tape are secured over substantially their entire areas to said first sheet and the latter may be folded along a medial line between said second sheet and tape to bring the two into juxtaposition with said one surface of said second sheet in facing engagement with said other surface of said tape.

7. The invention according to claim 6 wherein a portion of said first sheet extends outwardly from said second sheet to provide a portion for adhesively securing to an underlying support surface with said other surface of said tape facing upwardly.

8. The invention according to claim 7 wherein said first sheet is under said second sheet on the side of said medial line on which said second sheet is attached to said first sheet rather than on the side on which said tape is attached to said second sheet, said tape and said second sheet on the side of said medial line on which said tape is attached both being of substantially the same width.

9. The invention according to claim 1 and further including a third sheet secured to said first sheet by said pressure sensitive adhesive along mutually overlapping marginal edges, said second sheet being attached along a marginal edge portion thereof to said first sheet adjacent the attachment thereto of said third sheet, said second sheet extending from its attached edge in covering relation to said third sheet, the latter being folded along a line parallel to said marginal edge thereof to form two layers with a major portion of said second sheet disposed therebetween, said tape being disposed between said second sheet and the one of said layers of said third sheet not secured to said first sheet.

10. The invention according to claim 9 wherein said third sheet extends from said marginal edge to a parallel free edge with said fold line therebetween, the width of said third sheet between said fold line and said free edge being substantially equal to the width of said label, the latter being disposed between said second sheet and the layer of said third sheet between said fold line and said free edge.

* * * * *